Nov. 13, 1962 G. B. THURSTONE ET AL 3,063,706
ENGINE REPAIR STAND
Filed July 28, 1958 5 Sheets-Sheet 3
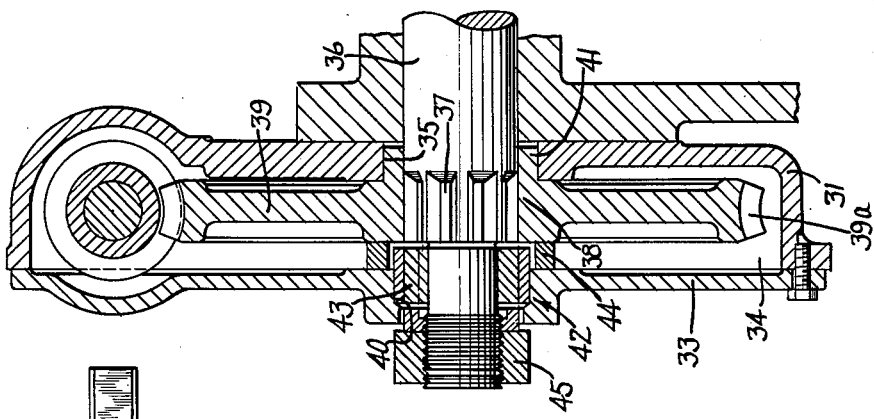
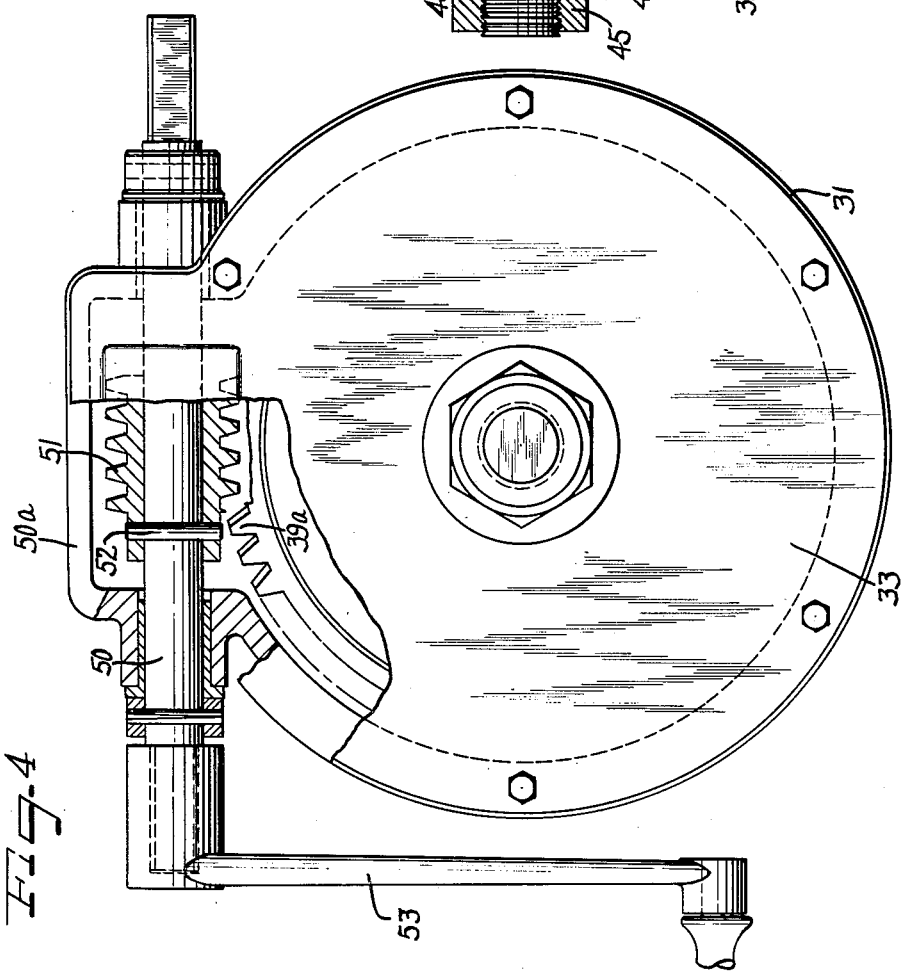
Inventors
Granger B. Thurstone
William F. Behm
Attys

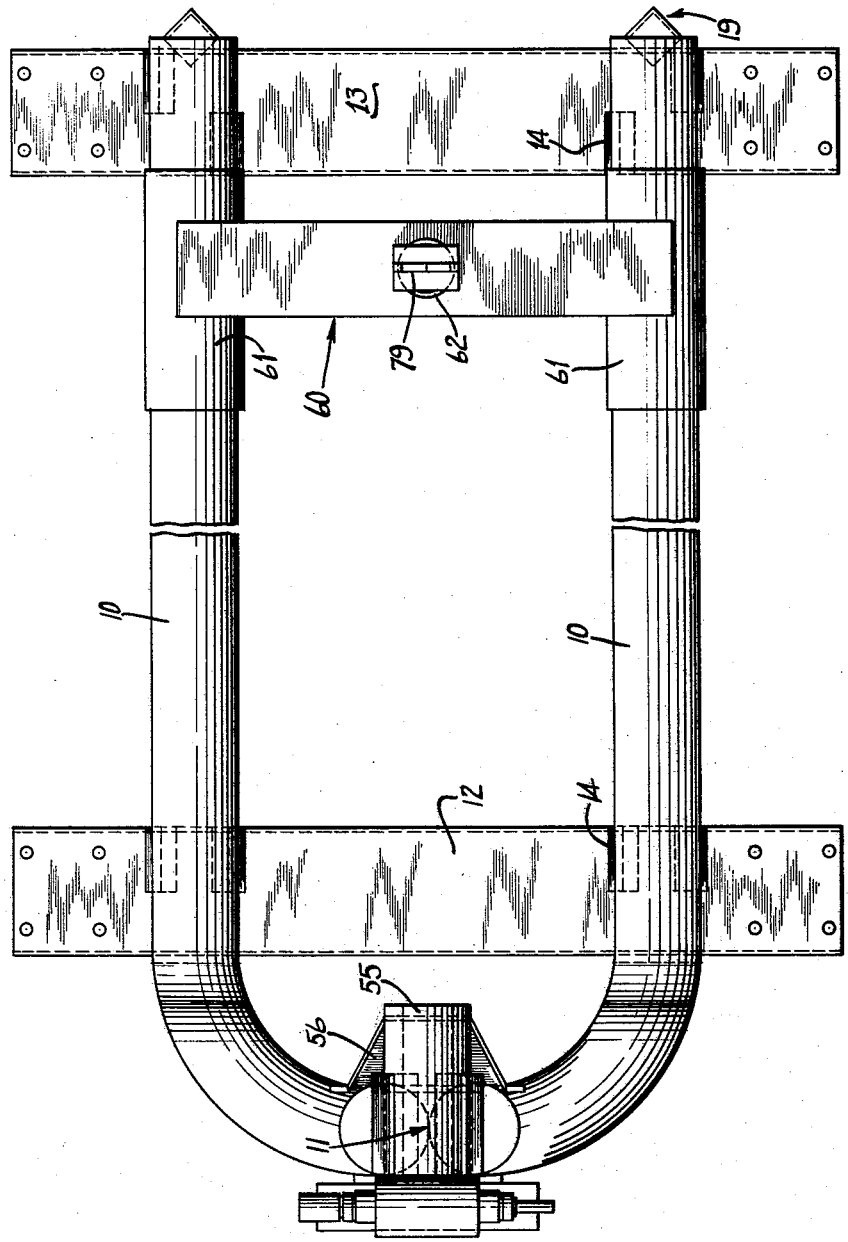

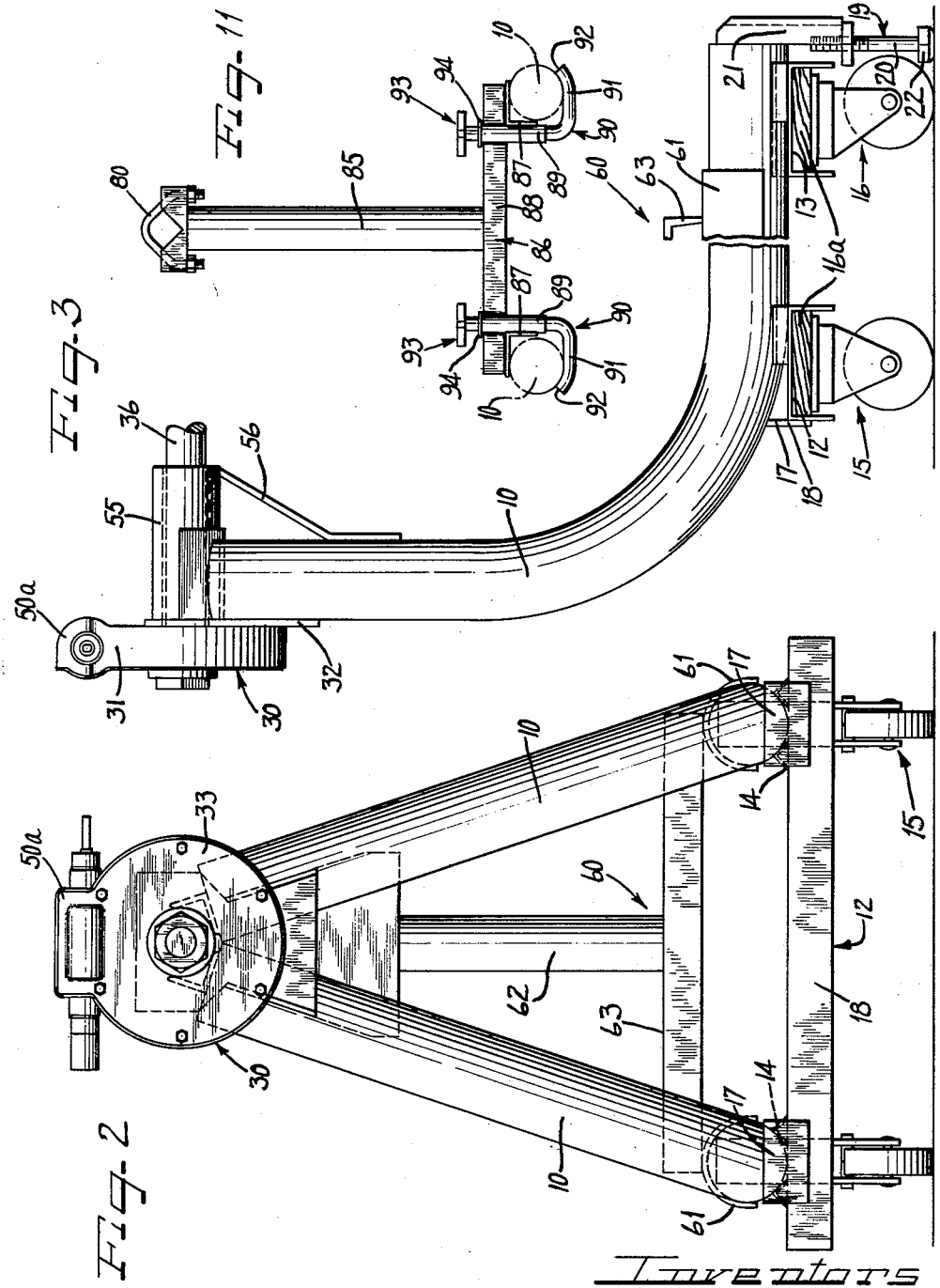

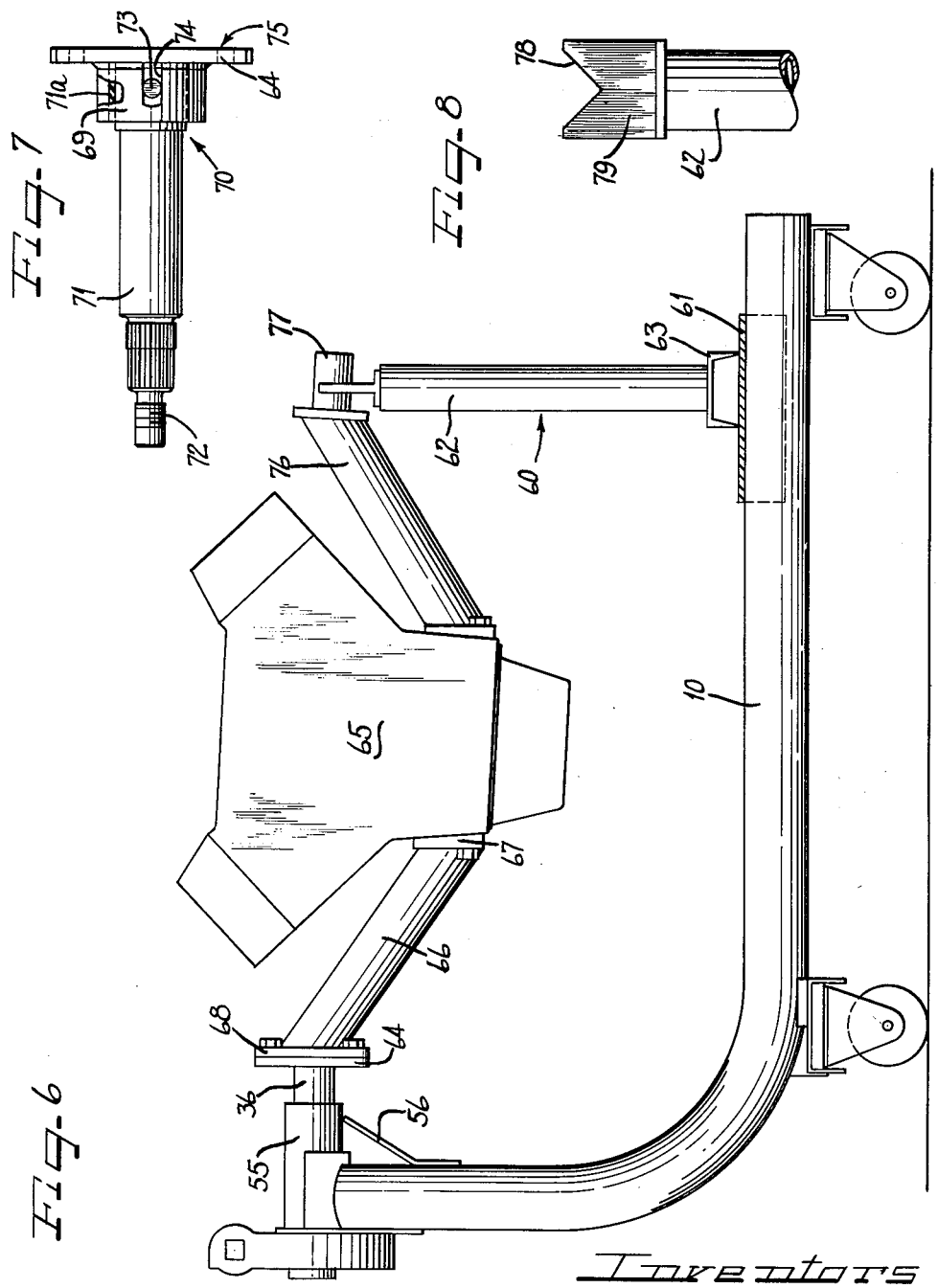

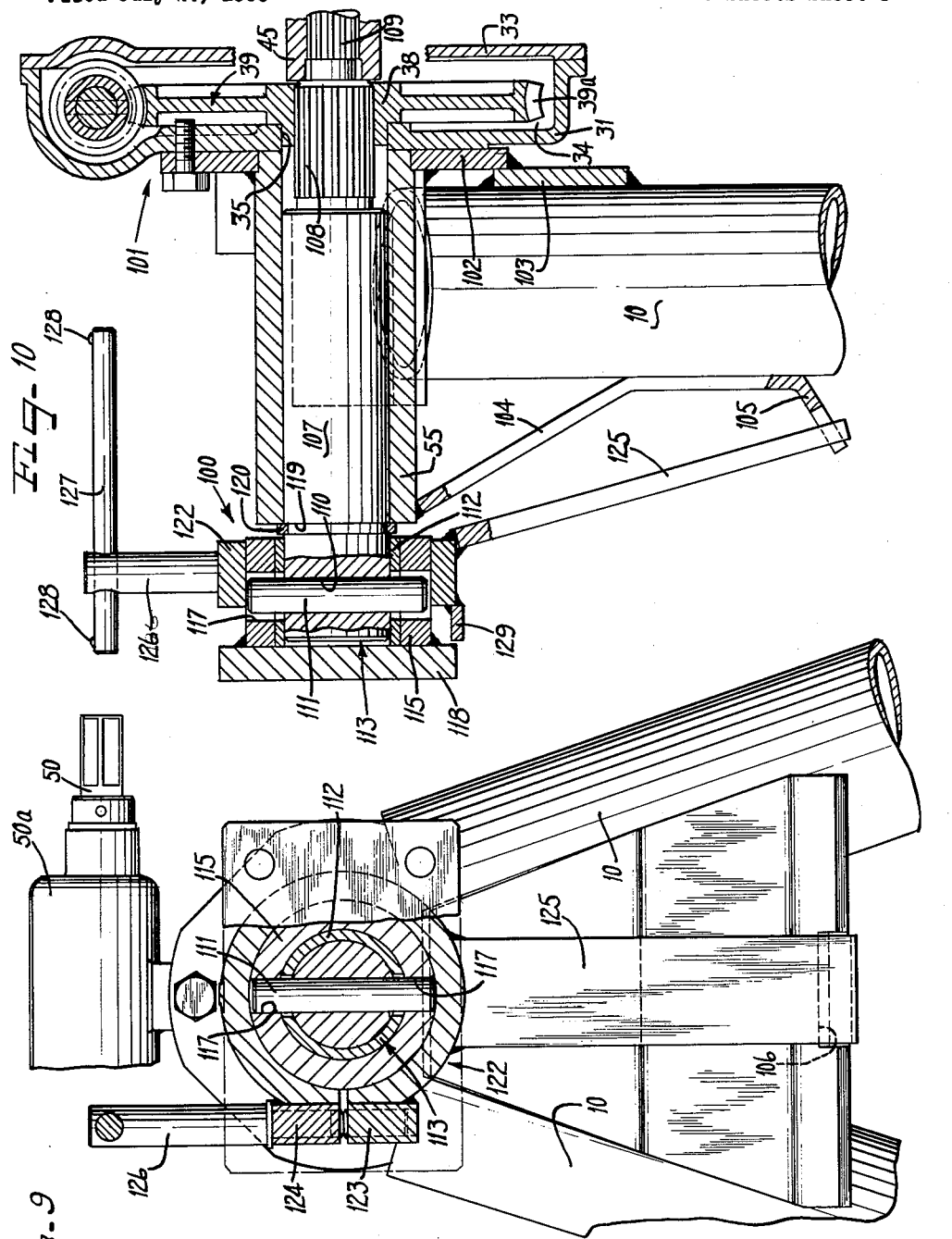

United States Patent Office 3,063,706
Patented Nov. 13, 1962

3,063,706
ENGINE REPAIR STAND
Granger B. Thurstone, Williamsville, and William F. Behm, Cowlesville, N.Y., assignors to Houdaille Industries, Inc., Buffalo, N.Y., a corporation of Michigan
Filed July 28, 1958, Ser. No. 751,374
3 Claims. (Cl. 269—61)

This invention relates to engine repair stands and more particularly relates to engine stands provided with means for rotatably supporting an engine or the like to provide access to each of its parts.

Formerly, engine repair stands of the type above described have been provided with positioning indexes and mechanical locks to maintain a desired position of the engine with respect to the stand. However, such means are unsatisfactory for engines of the type now commonly used since the newer engines are much heavier and wider than those in the past. The extra size and weight of the new engines require a more positive locking arrangement to prevent possible injury to the mechanic which might result from the engine immediately rotating when the mechanical latch is released.

It has in the past often been found advantageous to mount an engine or the like in cantilever fashion to accommodate the original buildup or service of the engine. However, due to the increased weight and size of many automotive components and other similar mechanisms, it has been found advantageous to support the mechanisms at each side thereof to prevent any undue stress on the mechanism itself.

If an engine repair stand is to be used in a garage, for example, it is obviously desirable to provide a stand which can readily be moved from one point to another.

Accordingly, it is a principal object of this invention to provide a lightweight movable engine repair stand which has the rigidity and strength to support relatively heavy objects.

A further object of this invention is to provide a lightweight engine repair stand preferably of tubular construction arranged to support an engine or the like either on both sides thereof or in cantilever fashion depending on the construction and weight of the object to be supported.

It is another object of this invention to provide a lightweight, movable engine repair stand of the type above described having means for rotating an engine or the like a full 360° and including a positive floor locking device to provide necessary stability.

A still further object of this invention is to provide means for compensating for any misalignment between the connection points of the objects supported and the engine stand when the object is supported on both sides thereof.

A further and important object of the invention is to provide a means for locking the engine or other object supported in any desired position to positively prevent any undesired rotation of the object supported.

These and other objects of the invention will become apparent from time to time as the following specification proceeds and with reference to the accompanying drawings wherein:

In the drawings:
FIGURE 1 is a plan view of an engine repair stand constructed in accordance with the present invention;
FIGURE 2 is a front elevational view of the device illustrated in FIGURE 1;
FIGURE 3 is a side elevational view of the device illustrated in FIGURE 1;
FIGURE 4 is a front elevational view of the worm gear assembly for rotating the engine showing some parts in section and others in front elevation;
FIGURE 5 is a vertical sectional view through the worm gear assembly illustrated in FIGURE 4;
FIGURE 6 is a side elevational view of an engine repair stand constructed in accordance with the principles of this invention showing a typical twin post mounting of an engine to be serviced;
FIGURE 7 is a partially sectioned plane view of the universal joint connection at the geared head;
FIGURE 8 is an enlarged front elevational view of the upper end portion of the outboard support illustrated in FIGURES 1–3;
FIGURE 9 is a partially sectioned, front elevational view of the spindle lock for preventing undesired rotation of the object supported;
FIGURE 10 is a vertical sectional view through the spindle lock illustrated in FIGURE 9; and
FIGURE 11 is a side elevational view of a different form of outboard support from that shown in FIGURES 1, 2, 3, 6 and 8.

Referring now particularly to FIGURES 1 through 3 of the drawings, applicants' novel engine repair stand is shown as comprising generally a bipod support consisting of two hollow tubular L-shaped members 10 which are welded together at their apex 11. A pair of channel members 12 and 13 are welded to the bottom of the horizontally extending portions of the tubular members 10 as indicated at 14. It will be noted that the channel members 12 and 13 extend considerably beyond the width of the tubular support members 10 in order to provide added stability to the structure to prevent any possible tipping of the stand.

A pair of non-swivel casters 15 are provided at the outer extremities of the channel member 12 and a pair of swivel casters 16 are provided at the outer extremities of channel member 13. It will be noted that wooden blocks 16a have been provided between each of the casters and the respective channel members to which they are connected to act as a sound and vibration dampener. Since the tubular support members 10 do not fully overlie the upper surface of the channel member 12, a pair of braces 17 are welded to the forward depending portion 18 of the channel member 12 and abut the upwardly curving surfaces of the tubular members 10 to distribute the weight carried by the channel member 12 evenly over its width.

Obviously, in servicing a mechanism such as an engine or the like, it is advantageous to prevent movement of the repair stand while the stand is in use. To this end, a floor lock 19 has been provided which comprises a threaded stud or jack screw 20 which is threadably mounted in a bracket 21 that is welded to the outer end portions of the tubular members 10. Each of the studs 20 has a hexagonal or squared head 22 at the lower end thereof which may be engaged and turned by a suitable wrench to extensibly move the jack screw 20 with respect to the bracket 21 to shift the weight carried by the swivel casters 16 to the floor lock 19 to prevent the stand from moving during use.

A worm gear assembly 30 is provided at the apex of the tubular members 10 and comprises generally a gear housing 31 that is welded or otherwise rigidly secured to a face plate 32 which in turn is welded to the tubular frame support members at the apex 11 where the two members converge. A removable face plate 33 is bolted to the gear housing 31 to form a gear chamber 34 therein. The gear housing 31 is centrally apertured as indicated at 35 to receive a driving shaft 36 which is suitably connected to the mechanism to be supported in a manner which will be hereinafter explained more fully in detail.

The driving shaft or spindle 36 is externally splined as at 37 to coact with the internal splines 38 of the worm wheel 39. An annular boss 41 of the worm wheel 39 is journaled in the aperture 35 of the gear housing 31 for rotatable movement with respect thereto. The forward end portion of the driving shaft 36 which supports the worm wheel 39 is journaled in a central aperture 40 in the face plate 33 is indicated generally at 42.

A bearing 43 supported by the driving shaft 36 positions the driving shaft within the central aperture 40 in the facing plate 33 and is encircled by a spacer member 44 which lies between the inner wall of the facing plate 33 and the worm wheel 39 to suitably position the worm wheel within the gear chamber 34. As stop nut 45 is provided on the outer threaded end portion of the driving shaft 36 to prevent the shaft from sliding out of the gear housing 31 and to provide a means for readily removing and replacing the driving shaft 36 with another for reasons which will hereinafter become obvious.

A gear shaft 50 is journaled for rotatable movement in the peripheral boss 50a of the gear housing 31 and extends outwardly from both sides thereof. A worm gear 51 is conventionally centrally attached to the gear shaft 50 and is prevented from rotatable movement with respect thereto by a pin 52 which extends through both the gear shaft 50 and the worm gear 51. The worm 51 is helically threaded and is arranged to mesh in driving engagement with the peripheral teeth 39a on the worm wheel 39. It will be noted that the outer ends of the gear shaft 50 are slightly reduced in diameter from the central portion of the shaft and are of a substantially rectangular shape so as to receive a crankshaft handle 53 in driving engagement therewith.

It is apparent that the crankshaft handle 53 is arranged to be placed on either end of the gear shaft 50 as dictated by the convenience of the operator.

A cylindrical guide 55 is provided at the apex of the tubular members 10 and is welded or otherwise rigidly secured to the tubular members 10 and the facing plate 32 to provide a means for supporting the weight carrying shaft 36. That portion of the cylindrical guide 55 which overhangs the upstanding portion of the frame members 10 is further supported by an angle brace 56 which is welded to the guide 55 and the tubular members 10. It will now be apparent that the driving shaft 36 is arranged to fit snugly within the cylindrical guide 55 and to be connected, at its outer end portion, to a mounting bracket 66 suitably connected to the object to be supported.

Referring now more particularly to FIGURES 1 through 3 and 6, an outboard support 60 is provided to carry approximately one-half of the weight of an object to be supported when so desired. The outboard support 60 comprises generally a flat bed 63 rigidly centrally secured to an upstanding brace 62 and which is connected at the outer ends thereof to semi-cylindrical runners 61 which are adapted to seat on the horizontally extending portion of the tubular members 10. The bed 63 intermediate the brace 62 and the runners 61 provides a means for distributing the weight on the members 10. It will herein be noted that the runners 61 conform to the shape of the tubular members 10 so that the support 60 may readily be slipped on or off the tubular members 10 as desired.

FIGURE 11 illustrates a different embodiment of the outboard support hereinbefore described and includes a supporting brace 85 which is centrally rigidly secured, as by welding or the like, to a flat bed 86 which, in turn, is arranged to be supported by the horizontally extending tubular members 10. Angle brackets 87 are similarly rigidly secured to the depending longitudinal flanges 88 and are arranged to seat upon the members 10 and further provide a brace for a pair of cylindrical guides 89 to which they are secured. The guides 89 are also secured to the bed 86 and are arranged to slidably receive lock members 90 which have threaded upper end portions (not shown) and laterally extending portions 91 forming the lower ends thereof. The laterally extending portions 91 terminate in upwardly curved ends 92 which are arranged to grip the tubular members 10 to secure the bed 86 thereto. Lock knobs 93 are mounted on the upper threaded ends of the members 90 and are spaced from the bed 86 by low friction washers 94 so that by turning the lock knobs 93 in one direction the lock members 90 can be tightened down against the tubular members 10 to rigidly secure the outboard support on the object supporting stand.

Referring particularly now to FIGURE 6, an engine 65 is diagrammatically shown as being supported in the following manner: A mounting bracket 66 having angular facing plates 67 and 68 on opposed ends thereof is arranged to be connected at one end portion with one side of the engine 65. Facing plate 68 on the other end of the mounting bracket 66 is arranged to abut and be rigidly secured to a facing plate 64 which is formed integrally with and comprises a part of a universal head 75 of a universal drive 70 illustrated in FIGURE 7. Facing plates 64 and 68 are secured together by means of bolts which extend through the plate 68 and are screw threaded into the plate 64.

The universal drive 70 may be substituted in place of the shaft 36 which, like the universal drive 70 has an end plate 64 formed thereon for connection with the plate 68. The universal drive 70 includes a splined drive shaft 71 which is threaded at the radially reduced end portion 72 to receive the stop nut 45 shown in FIGURE 5. The drive shaft 71 is radially apertured at the other end thereof to receive a torque pin 73 which protrudes from each side thereof and is received within opposed pin slots 74 in the cylindrical receiving portion 69 of the universal head 75 to drivingly engage the same. It will be noted that a resilient sleeve 71a of rubber, or any of the well known substitutes therefor, is fitted about one end portion of the shaft 71 between the shaft and the cylindrical receiving portion 69 of the universal head 75 to provide a reaction cushion for the shaft 71 for reasons which will hereinafter become apparent.

Similiarly, a mounting bracket 76 is shown as being connected to the opposite side of the engine 65 and as having a cylindrically shaped substantially horizontally extending outer end portion 77. A V-shaped socket 78 is provided within a yoke 79 which may be welded or otherwise rigidly secured to the upper end portion of either of the braces 62 or 85 and is arranged to rotatably receive the cylindrical end portion 77 of the mounting bracket 76. Furthermore, as shown in FIGURE 11 a strap 80 may be bolted to the yoke 79 to seat and maintain the end portion 77 of bracket 76 within the socket 78.

In this manner, the engine 65, or any other object to be supported, may be connected at each side thereof to the mounting brackets 66 and 76 and supported as shown in FIGURE 6 to eliminate undue stresses on the mechanism being serviced.

It will now be apparent that the universal drive 70 is arranged to drivingly interconnect the driving shaft 71, which is itself drivingly connected to the worm wheel 39, and the facing plate 64 and that the resilient sleeve 71a provides a reaction cushion for the shaft 71 to compensate for any misalignment between the mounting brackets 66 and 76 and their respective points of connection to the engine stand and the outboard support.

It may, of course, be necessary to provide mounting brackets of slightly different configuration than the brackets 66 and 76 depending upon the particular configuration of the object to be supported. Obviously, this novel engine repair stand can be used for repairing or servicing engines, transmissions, rear axles, or other similar devices or for originally constructing such mechanisms.

Referring more particularly to the embodiment of the invention illustrated in FIGURES 9 and 10, a spindle lock assembly 100 is shown as being associated with the geared head 101 of the object supporting stand which forms the subject of this invention. It will be noted that the geared head 101 is substantially the same as that illustrated and described with reference to FIGURES 4 and 5 and includes a gear housing 31 which is secured by means of facing plates 102 and 103 to the tubular members 10 at their apex. The cylindrical guide 55 is suitably secured as by welding or the like to the apex of the tubular members 10 and is secured, at one end thereof, to the gear housing 31 concentrically with the spindle or driving shaft receiving aperture 35. An angle brace or bracket 104 is secured to the tubular members 10 at the outer end of the cylindrical guide 55 to provide a supporting means for the guide 55 and has a generally laterally extending flange 105 formed at the lower end thereof which is centrally slotted as at 106 for reasons which will hereinafter become apparent.

A driving shaft or spindle 107 similar to the shafts 36 and 71 is externally splined as at 108 to coact with the internal splines 38 on the worm wheel 39. The shaft 107 has an outer radially reduced end portion 109 which is threaded to receive the stop nut 45 hereinbefore described.

As with the shaft 71 illustrated in FIGURE 7 the spindle 107 is radially apertured as at 110 to receive a torque pin 111 which is of greater length than the diameter of the shaft 107. A resilient liner 112 is fitted about the apertured end 113 of the shaft 107 and is similar in configuration to the liner 71a previously described. A cylindrically shaped torque transmitting member 115 is fitted about the resilient sleeve 112 and has a pair of opposed apertures 117 therein which are arranged to receive the protruding end portions of the torque pin 111. A facing plate 118 is suitably secured as by welding or the like to the torque transmitting member 115 and is arranged to be connected to the facing plate 68 which is formed integrally with or connected to the mounting bracket 66 which, in turn, is connected with the engine or object to be supported 65.

It will further be apparent that the spindle 107 is circumferentially grooved as to 119 to receive a snap ring 120 which maintains the shaft 107 and the cylindrical guide 55 in axial relation with respect to one another. Obviously, since the opposed apertures 117 in the torque transmitting member 115 are formed diametrically greater than the torque pin 111 and since resilient sleeve 112 has been provided intermediate the shaft 107 and the torque transmitting member 115 a universal drive connection has been provided similar to the universal drive connection 70 illustrated and described with respect to FIGURE 7. However, in this particular embodiment of the invention a means has been provided for positively locking the spindle or driving shaft 107 in any desired position to eliminate all torsional instability in the object supporting stand such as might be occasioned by a backlash in the geared head assembly or in the universal joint itself.

In this particular embodiment of the invention a spindle lock 100 has been provided which comprises a generally cylindrical C-shaped ring 122 which has a pair of hollow bosses 123 and 124 formed integrally therewith on opposed ends thereof which lie adjacent one another having their hollow interiors axially positioned in registry with one another. A bracket 125 is rigidly secured as by welding or the like to a portion of the C-shaped ring or clamp 122 and extends angularly downwardly and is received within the central slot 106 in the flange 105 of supporting bracket 104. A locking screw 126 is rotatably mounted within the hollow interiors of the boss 124 and is threadedly mounted within the hollow interior of the boss 123 and is apertured at the upper end thereof to receive a lever 127 having a pair of stops 128 at either end thereof.

It will thus be apparent that when the object being supported is suitably connected with the facing plate 118 and when the object has been moved to the desired position by the worm gear assembly illustrated in FIGURES 4 and 5, the lever 127 may be turned rotatably to tighten the C-clamp or ring 122 down against the torque transmission member 115 to prevent movement of member 115 with respect to the C-clamp 122. Since the bracket 125 is received within slot 106 the C-clamp 122 and consequently the torque transmission member 115 and the object supporting shaft to which it is drivingly connected, will be prevented from rotatably moving. It will further be apparent that a spacer bar 129 is provided intermediate the C-clamp 122 and the facing plate 118 to maintain the C-clamp 122 properly positioned about the torque transmission member 115.

It will be noted that the spindle locking device 100 is attached to the outer torque transmitting member 115 of the universal joint drive shaft, as close as possible to the object supported by the engine stand. The shape of the central slot 106 in combination with the flat cross-section of bar 125 permits the C-clamp 122, when loose or clamped, to conform with any movements and or positions of member 115 as caused by misalignment.

Since the major part of the repair stand is composed of hollow tubular members, the weight of the stand is considerably reduced from that encountered with previous devices of a similar nature. This feature, of course, makes the engine stand much more practical in use since it enables the operator to move it easily at will while, at the same time, the weight carrying capacity of the stand is not diminished. Also, while casters have been provided to make the engine stand mobile, a means is provided for taking the weight off of the casters to stationarily position the engine stand. Furthermore, an object supporting stand has been provided which can either support an object in cantilever fashion or on each side thereof. Still further, when the object being supported is supported on both sides thereof a means is provided for compensating for any misalignment between the supports.

Yet another feature of applicants' novel object supporting stand is that a spindle lock is provided to positively lock the object supporting spindle in any desired position to provide a torsion free system when the stand is used as a twin post mounting for the object supported.

It will also be noted that this repair stand obviates the problem in cantilever engine stands of excessive overhangs since there are not positioning indexes and, consequently, the engine may be mounted considerably closer to its support than was possible with previous engine stands having positioning indexes.

Another important feature of applicants' device is the outboard support which may readily be slipped on or off the tubular members 10 as desired in accordance with the size and/or weight of the object to be supported.

It will herein be understood that these embodiments of the invention have been used for illustrative purposes only and that various modifications and variations of the present invention may be effected without departing from the spirit and scope of the novel concepts thereof.

We claim as our invention:

1. An object supporting stand comprising two substantially L-shaped tubular members rigidly connected at their apex having their base portions spaced apart and extending substantially in the same direction, gear means of high reduction ratio secured to said tubular members at their apex, an outboard support removably slidably mounted on the base portions of said tubular members, means for securing the object to be supported to the output end of said gear means, manually operable means connected to the input end of said gear means for effecting rotatable movement of the object supported, means for movably connecting the object supported to said outboard support, and second means between said first means and the output end of said gear means for compensating for misalignment between the output end of said gear means and the upper end of said outboard support.

2. An object supporting stand comprising two substantially L-shaped tubular members rigidly connected at their apex and lying substantially parallel to one another, an outboard support removably slidably mounted on the base portions of said tubular members, a yoke at the upper end of said outboard support, a mounting bracket adapted to be connected at one end to an object to be supported and to be journaled at its other end portion in said yoke, gear means of high reduction ratio secured to said tubular members at their apex, means for securing the object to be supported to the output end of said gear means, manually operable means connected to the input end of said gear means for effecting rotatable movement of the object supported, and second means between said first means and the output end of said gear means for compensating for misalignment between the output end of said gear means and the upper end of said outboard support.

3. An object supporting stand comprising two substantially L-shaped tubular members rigidly connected at their apex and lying substantially parallel to one another, an outboard support mounted on the base portions of said tubular members, a mounting bracket adapted to be connected at one end to an object to be supported and to be rotatably connected at its other end portion to said outboard support, gear means of high reduction ratio secured to said tubular members at their apex, means for securing the object to be supported to the output end of said gear means, manually operable means connected to the input end of said gear means for effecting rotatable movement of the object supported, and second means between said first means and the output end of said gear means for compensating for misalignment between the output end of said gear means and the upper end of said outboard support.

References Cited in the file of this patent

UNITED STATES PATENTS

| | | |
|---|---|---|
| 1,127,969 | Dolder | Feb. 9, 1915 |
| 1,295,463 | Flair | Feb. 25, 1919 |
| 1,373,526 | Price et al. | Apr. 5, 1921 |
| 1,468,397 | Radke et al. | Sept. 18, 1923 |
| 1,471,992 | Wigness et al. | Oct. 23, 1923 |
| 1,481,503 | Carswell et al. | Jan. 22, 1924 |
| 1,792,612 | Staley | Feb. 17, 1931 |
| 2,427,695 | Smith | Sept. 23, 1947 |
| 2,463,383 | Hokanson | Mar. 1, 1949 |
| 2,513,959 | Onsrud | July 4, 1950 |
| 2,554,311 | Place | May 22, 1951 |
| 2,568,508 | Montague | Sept. 18, 1951 |

FOREIGN PATENTS

| | | |
|---|---|---|
| 32,070 | France | Mar. 29, 1927 |